Figure 1:
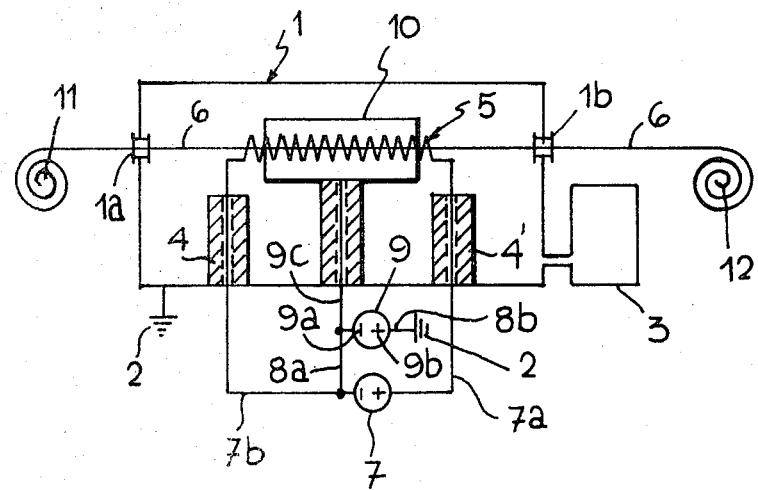

United States Patent [19]

Streel

[11] 3,852,560
[45] Dec. 3, 1974

[54] CONTINUOUS ELECTRONIC HEATING DEVICE FOR METALLIC WIRE AND SHEET METAL

[75] Inventor: Dominique Streel, Sclessin-Ougree, Belgium

[73] Assignee: Cockerill-Ougree-Providence et Esperance-Longdoz, Seraing-lez-Leige, Belgium

[22] Filed: May 21, 1973

[21] Appl. No.: 362,608

[30] Foreign Application Priority Data
May 31, 1972  Belgium .................................. 43722

[52] U.S. Cl. .......................... 219/121 EB, 219/155
[51] Int. Cl. ............................................ B23k 15/00
[58] Field of Search ....... 219/121 EB, 121 EM, 155; 315/111; 250/493

[56] References Cited
UNITED STATES PATENTS

| | | |
|---|---|---|
| 3,020,387 | 2/1962 | Basche et al. ............. 219/121 EB X |
| 3,172,007 | 3/1965 | Hanks et al. ............... 219/121 EB X |
| 3,244,855 | 4/1966 | Cauley ......................... 219/121 EB |
| 3,440,390 | 4/1969 | McCullough et al. ........ 219/121 EB |
| 3,529,123 | 9/1970 | Hinrichs ....................... 219/121 EB |
| 3,596,046 | 7/1971 | Valleins et al. .............. 219/121 EB |

*Primary Examiner*—J. V. Truhe
*Assistant Examiner*—G. R. Peterson
*Attorney, Agent, or Firm*—Kaufman & Kramer

[57] ABSTRACT

A device for heating a metallic product of great length and small thickness, particularly a wire or sheet metal, by means of a flow of electrons comprises a container in which there is maintained a permanent vacuum of $10^{-3}$ to $10^{-5}$ torr. The container contains the metallic product to be heated, a means for the production of electrons which, by the action of an electrical field, are hurled onto the product, and reflecting means for returning toward the product any electrons which have escaped from said field.

6 Claims, 4 Drawing Figures

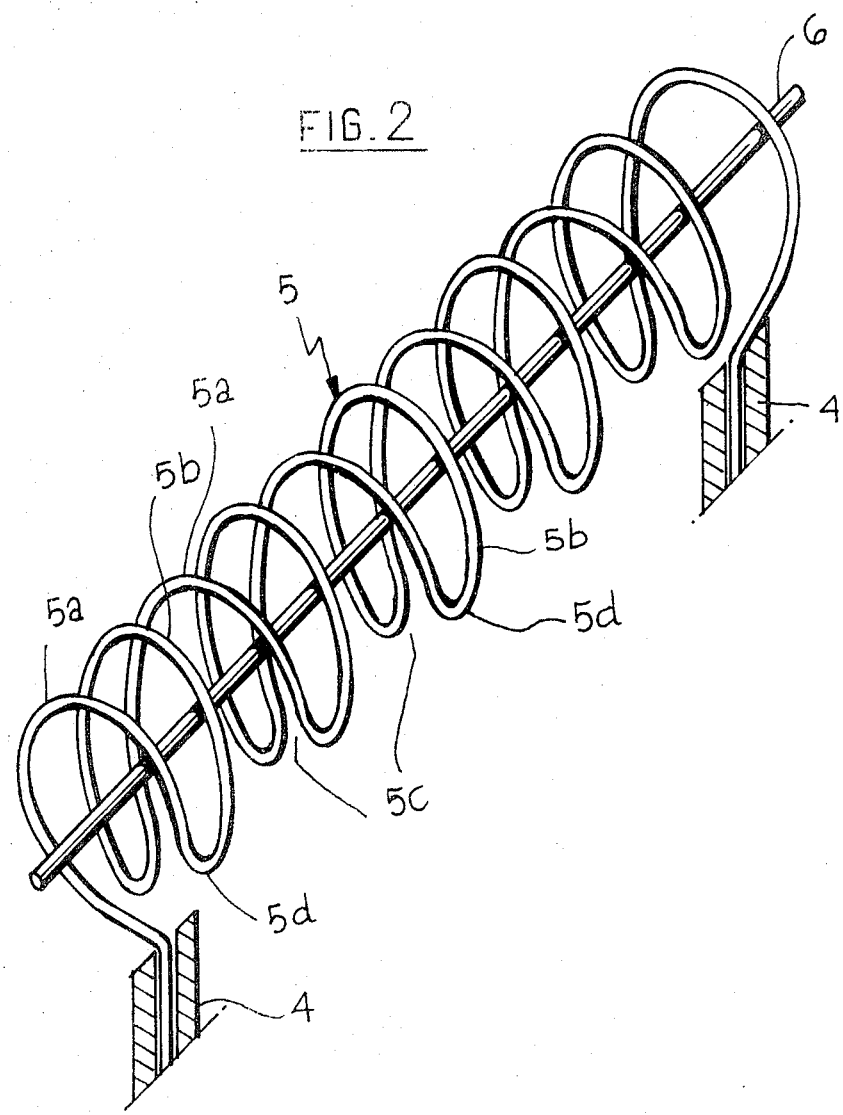

CONTINUOUS ELECTRONIC HEATING DEVICE FOR METALLIC WIRE AND SHEET METAL

The present invention concerns a device for heating a metallic product of great length and small thickness, particularly a wire or sheet of metal.

Amongst the various methods of heating a metallic product which are already known are those in particular which make use of various effects of electrical energy. Thus it is possible to heat a metallic product by the Joule effect by causing an intense electric current to pass directly through it; it is also possible to pass an electric current through an electrical resistance which heats up and radiates the heat toward the product to be heated; heating can also be achieved by the phenomenon of induction.

It is known that it is also possible to heat a metallic product placed in a vacuum by bombarding it with a flow of electrons; in this case an emitter of electrons such as a Pierce drum emits a flow of electrons, the direction of which is controlled by the action of a modulated magnetic field so that the beam of electrons sweeps over the whole of the surface of the product which is to be heated.

In practice devices based on these procedures require large installations which can be complex and costly, which are furthermore difficult to control, and which in addition generally have a rather weak output. These disadvantages greatly limit the use of the known heating devices in particular for the heating of wires or metal sheets.

The present invention concerns a device in a vacuum for heating a metallic product of great length and small thickness, particularly a wire or a sheet by means of a flow of electrons. The device comprises an enclosure in which there is a permanent vacuum of $10^{-3}$ to $10^{-5}$ torr and containing the products to be heated, means for the production of electrons which by the action of an electrical field are hurled onto the product to be heated and reflecting means which serve to redirect towards the product to be heated electrons which escape said field.

According to one feature the means for the production of the electrons comprises an electrical conductor composed of a refractory metal of the group tungsten, molybdenum or tantalum connected to a first source of electric current to heat it; this conductor is in the form of a coil having at least one turn and along the axis of which the product to be heated is fed.

According to another feature, the means for the production of the electrons is connected to the negative terminal of a second source of potential which imparts to it a potential which is very negative with respect to the product to be heated. This negative terminal, which is grounded, gives rise to an electric field to hurl electrons on to the product to be heated. The electrons emitted thus acquire a very high speed and possess a kinetic energy proportional to the difference in potential between the means producing the electrons and the product to be heated; this kinetic energy is transformed into heat energy upon the impact of the electrons upon the product to be heated.

According another feature, the electrical conductor, the producer of the electrons, is spaced from the product to be heated by a small distance which can be of from 5 to 15 mm.

According to one embodiment the turn of the coil is completely closed on itself as in a bobbin. According to another embodiment the turn of the coil is an open loop having a re-entrant point froming a narrow space slightly greater than the thickness of the product to be heated; the product passes through this space in order to be introduced into the coil.

According to another feature, the reflecting means for the electrons which have escaped the electrical field comprises a metallic cage enclosing the means producing the electrons from which it is separated by a distance which can be 5 to 15 mm. The metallic cage is connected to the negative terminal of a second source of potential, which imparts to the cage to a very negative potential with respect to the product to be heated, thus returning toward the product the electrons which have been deflected away.

Figure 4:
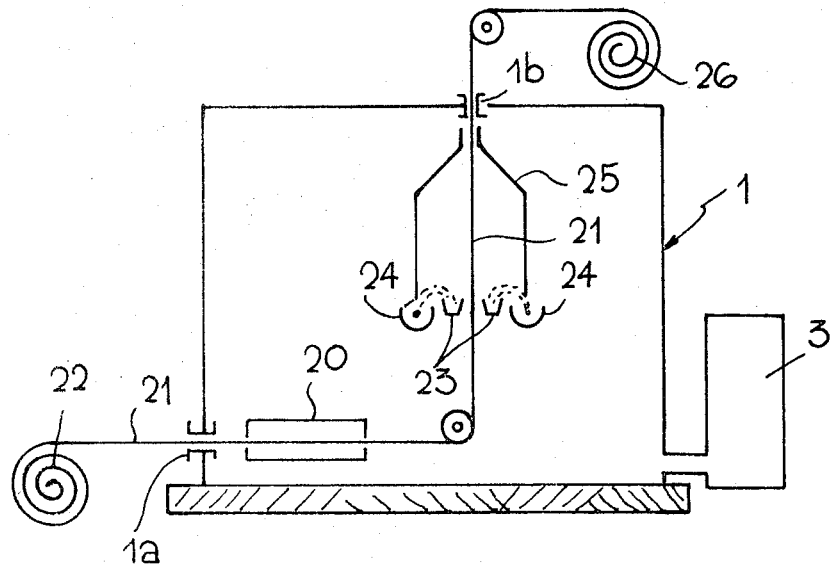
Figure 3:
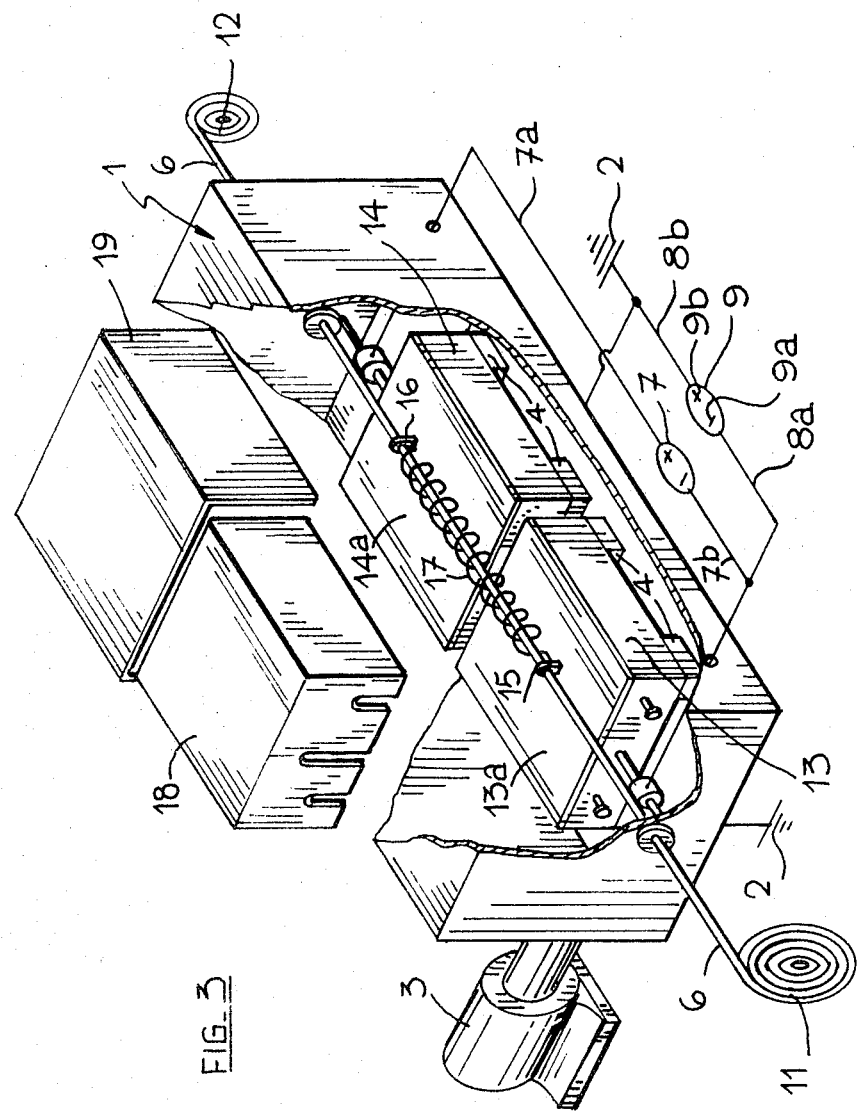

Other features will appear in the course of the following description which is made with reference to the accompanying drawings. FIG. 1 is a diagrammatic view of a heating device according to the invention. FIG. 2 is a perspective view of a metallic conductor for the production of the electrons. FIG. 3 is a diagrammatic view in perspective of a modified embodiment. FIG. 4 is a diagrammatic view of a heating device according to the invention incorporated into apparatus for coating by vacuum evaporation. In the drawings the same reference numerals are used for parts which are identical or analogous.

FIG. 1 shows a heating device which comprises a container 1 connected to earth at 2. This container is connected to a pumping device 3 of the kind which will maintain in it a permanent vacuum of about $10^{-3}$ to $10^{-5}$ torr. In the container there are insulated supports 4 which carry a coil 5 of an electrically conducting refractory metal such for example as tungsten. This insulated coil 5 comprises a series of turns 5a 5b (FIG. 2), alternatively in one direction and in the other and entirely closed upon themselves with the exception of a small gap 5c between the re-entrant points 5d of the turns. In this way at the start of an operation a metallic wire 6 to be heated is introduced into the coil by passing it transversely through the gaps 5c; this wire 6 is placed along the axis of the coil and moves along this axis. The coil 5 is a slight distance from wire 6, that is to say the distance between the wire 6 and the turns of the coil measured along a radius is about 5 to about 15 mm. Via the conductors of 7a 7b the coil 5 is connected in series with a first source of electricity 7 which provides it with a current at a voltage of about 50V and of about 40A and which constitutes the heating current of said coil which being heated in the vacuum thus emits a flow of electrons. From another side through the conductor 8a the coil 5 is connected to a negative pole 9a of a second source of voltage 9 which is strongly negative being capable of minus 500 volts to minus 15,000 volts; the positive pole 9b of the source 9 is connected by the conductor 8b to earth at 2.

In this way the coil 5 emits electrons which are immediately repulsed by the electrical field created by its very negative potential. Thus the electrons emitted are accelerated and possess a substantial kinetic energy which upon hitting the wire is transformed into heat such that the wire is strongly heated. The wire comes from a reel 11 and it advances along its length because it is drawn by a known device such as the bobbin 12 on which it is wound. The wire can be heated progressively from one end to the other and after emerging from the container 1 it can be subjected immediately to any operation while it is still hot. At its entry into the container and its exit therefrom the wire passes through seals 1a and 1b. Around the coil 5 there is a reflecting means for the electrons, this means comprises a metallic cage 10 of tubular shape which by means of a conductor 9c is connected to negative pole 9a of a second source of potential. Thus the electrons which do not directly heat the wire 6 and move towards the exterior to the coil 5 are repelled by the cage 10 and redirected towards the wire 6 which has the effect of increasing the yield of the device.

With the device described, a wire of a diameter of about 2 mm and moving forward at a speed of about 1 metre per second is brought to a temperature of about 700°C when the potential of the coil 5 is maintained at about minus 3,000 volts and when the heating current is 40A at a voltage of 50V.

The above device makes it easy to control the temperature of the product to be heated. For this purpose it is possible to vary the number of turns of the coil producing the electrons, the intensity of the heating current of this coil and the negative potential thereof.

Modifications can be made to the device which has been described without departing from the scope of the invention. Thus the coil which was described as having a generally cylindrical shape can be of some different shape following the configuration of a product which is to be heated.

In the case where the device is intended to heat a sheet of metal, the coil will have a very flattened cross-section of rectangular form and open along the length of one narrow side. In FIG. 3 which is a diagrammatic view partly in perspective, exploded, and broken away, another embodiment of the invention is shown. There is shown the sealed metallic container 1 connected to earth 2 and connected to the pumping station 3 to produce therein a vacuum of $10^{-3}$ to $10^{-5}$ torr which contains the insulated supports 4 upon which are fixed two separated plates 13 and 14 of solid copper; on their upper face these have refractory metal coatings such as tantalum indicated at 13a and 14a. On one of these coatings there is a terminal 15 and on the other a terminal 16. Between the terminals 15 and 16 is connected a coil 17 of tungsten constituting the means for producing electrons. The wire 6 to be heated passes along the axis of this coil which is composed of helical turns and is heated by the first source of current 7 connected to the plates 14 and 14 via the conductors 7a and 7b. On these plates 13 and 14 are fixed two parallelopiped hollow separated detachable members 18 and 19 composed of a refractory metal such a tantalum. These two pieces without contact with one another have the look of a cover, they form the metallic cage for the reflection of electrons which have escaped from the coil 17. They carry a potential which is very negative for, via the conductor 8a they are connected to the negative pole 9a of the second source of potential 9.

The device described above has been found particularly useful and advantageous to be incorporated in a plant for coating by vacuum evaporation where it is necessary to heat the product immediately before the application of the coating. A plant of this kind is shown diagrammatically in FIG. 4 in which the same reference numerals as in FIG. 3 relate to identical or analogous parts.

Such a plant comprises a container 1 connected to a pumping station 3 producing therein a permanent vacuum of $10^{-3}$ to $10^{-5}$ torr. In this case the container is of a size which is sufficient to contain both the elements of the heating device 20 analogous to that described above with reference to FIG. 3 and apparatus for metallising by vacuum evaporation.

A strip of sheet metal 21 fed from a reel 22 enters the container 1 through a seal 1a and passes through the heating device 20 from which it emerges at a temperature which can be in the region of 500°C, a temperature is eminently suitable for the application of the metallic coating.

The strip of sheet metal 21 passes then immediately into a vacuum metallising apparatus of known type. This device comprises essentially two crucibles 23 situated on either side of the strip 21. These crucibles of refractory material, loaded in a known manner with the metal to be vapourised before forming the coating, are bombarded by electron drums 24 of known type. The vapourised atoms are deposited on the stip of sheet metal 21 and there constitute the coating. These crucibles are covered by a hood 25 heated and maintained at a positive potential so that the atoms of vapourised metal which have not adhered directly to the sheet metal are returned to the crucibles. After emerging from the hood 25 the strip of sheet metal provided with the metallic coating emerges from the container 1 passing through the outlet seal 1b to be finally wound upon a reel 26.

What we claim is:

1. An electron heating device for a metallic wire or sheet comprising, in combination:
   a processing enclosure in which is maintained a vacuum of $10^{-3}$ to $10^{-5}$ torr and which is traversed by a continuously advancing metallic wire or sheet to be heated;
   an electron emitter mounted in the enclosure, said emitter comprising an electrical conductor in the form of a coil having at least one turn and along the axis of which the metallic wire or sheet is continuously advancing;
   a first source of current connected to said coil;
   a second source of current whose negative teriminal is connected to said coil and which has a very strong negative potential, thereby establishing an electrostatic field for accelerating the emitted electrons toward the metallic wire or sheet; and
   a metallic electron reflecting means connected to the negative terminal of said second source of current for reflecting back to the metallic wire or sheet any electrons which have escaped the electrostatic field.

2. An electron heating device according to claim 1 characterized in which the electron reflecting means is a housing enclosing the electron emitter.

3. An electron heating device according to claim 2 characterized in which the housing comprises two hollow separately detachable members not in contact with each other.

4. An electron heating device according to claim 1 in which the electron emitter is a coil turned in an open loop having a re-entrant point forming a passage for the continuously advancing metallic wire or sheet, the passage being of a dimension sufficient to permit the wire or sheet to be spaced from 5 to 15 mm from the coil.

5. An electron heating device according to claim 1 in which the electron emitter is a coil turned so that it is completely closed on itself and provides a passage for the continuously advancing metallic wire or sheet, the passage being of a dimension sufficient to permit the wire or sheet to be spaced from 5 to 15 mm from the coil.

6. An electron heating device according to claim 1 in which the second source of current provides a voltage of from 500 to 15,000.

\* \* \* \* \*